(12) United States Patent
Smith

(10) Patent No.: US 7,721,577 B2
(45) Date of Patent: May 25, 2010

(54) MANUFACTURING PROCESS FOR EXTENDING A LENGTH OF SERVICE OF COMPONENT PARTS

(75) Inventor: David B. Smith, Renton, WA (US)

(73) Assignee: The Boeing Company, Seattle, WA (US)

( * ) Notice: Subject to any disclaimer, the term of this patent is extended or adjusted under 35 U.S.C. 154(b) by 524 days.

(21) Appl. No.: 11/688,091

(22) Filed: Mar. 19, 2007

(65) Prior Publication Data

US 2008/0229798 A1 Sep. 25, 2008

(51) Int. Cl.
*B21C 51/00* (2006.01)
(52) U.S. Cl. .......................... 72/17.3; 72/15.2; 72/16.3; 72/75
(58) Field of Classification Search .................. 700/30, 700/108, 173–175; 72/17.3, 75
See application file for complete search history.

(56) References Cited

U.S. PATENT DOCUMENTS

| 6,353,768 | B1 * | 3/2002 | Karafillis et al. ............... 700/97 |
| 2003/0167617 | A1 * | 9/2003 | Easterbrook et al. .......... 29/428 |
| 2003/0225476 | A1 | 12/2003 | Mika et al. |
| 2004/0073323 | A1 | 4/2004 | Zhu et al. |

* cited by examiner

*Primary Examiner*—Dana Ross
*Assistant Examiner*—Matthew G Katcoff
(74) *Attorney, Agent, or Firm*—Weiss & Moy, P.C.

(57) ABSTRACT

A method for working a component to reduce a propensity for advanced dynamic change analyzes affects of a StressWave process on at least one location on a size and shape of the component. The component is also analyzed as to the affects of adding at least one feature on a size and shape of the component. A beginning shape of the component is then extrapolated.

15 Claims, 6 Drawing Sheets

MANUFACTURING PROCESS FOR EXTENDING A LENGTH OF SERVICE OF COMPONENT PARTS

BACKGROUND

Embodiments of this disclosure relates generally to extending a length of service of component parts, and more particularly, to method of extending a length of service of component parts so if a shape of the component changes during the process, the shape and size of the component still remains within a specified tolerance envelope to be used in final assembly.

In many aircraft, structural components may experience advanced dynamic changes. These advanced dynamic changes generally occur in features of the component such as in and around indentations, slots, holes, other types of openings, discontinuities or transition areas (hereinafter features). Advanced dynamic changes in these or other areas of the component may result in operating restrictions, and/or grounding of the aircraft.

Presently, there are several different methods to extend the length of service of structural components that may experience advanced dynamic changes. Coldworking is a process of expanding metal at a temperature below its annealing point in order to increase its hardness and tensile strength. Several methods of coldworking can be used. One method pushes a shaft having an enlarged diameter portion (commonly referred to as a mandrel) through an opening from one direction to radially expand the opening and compress the surrounding region to achieve a desired strain hardening. Another method involves lining the opening with a sleeve and pulling a mandrel through the sleeve to expand and thereby coldwork the opening. A further method includes inserting a collapsible mandrel (also known as a split mandrel) in collapsed form through the opening, expanding the mandrel, and then pulling the mandrel back through the opening to coldwork the opening. All of these methods require the feature to be present prior to coldworking. These methods may be difficult to automate.

Another method to extend the length of service of structural components that may experience advanced dynamic change is called StressWaving. StressWaving is a form of coldworking wherein compressive residual stresses are applied around areas of the component which may experience advanced dynamic changes. An indentation device is used to create the residual stresses around the areas of the component which may experience advanced dynamic changes. StressWave coldworking allows the coldworking process to be automated. Stresswaving imparts beneficial residual stress into a location prior to addition of a feature. The residual stresses applied increases the hardness and tensile strength of the area. After the StressWaving process, different features may be fabricated in to the component.

The coldworking process and adding the features may cause the component to change from its original shape and size. This is especially true when the component has a complex shape, a large number of areas of a component that need to be coldworked and/or when features formed in a component have a complex shape. Attempts to change the component back to its original shape and size may require the component going back through a stress relieve process that may eliminate the coldworked zone put into the component or may result in a non-beneficial high residual stress in the component.

Therefore, it would be desirable to provide a method of extending a length of service of component parts so that even if a shape of the component changes during the process, the size and shape of the component will remain within a specified tolerance envelope to be used in final assembly without high residual stress.

SUMMARY

A method for working a component to reduce a propensity for advanced dynamic change is disclosed. The method analyzes affects of a StressWave process on at least one location on a size and shape of the component. The component is also analyzed as to the affects of adding at least one feature on a size and shape of the component. A beginning shape of the component is then extrapolated.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
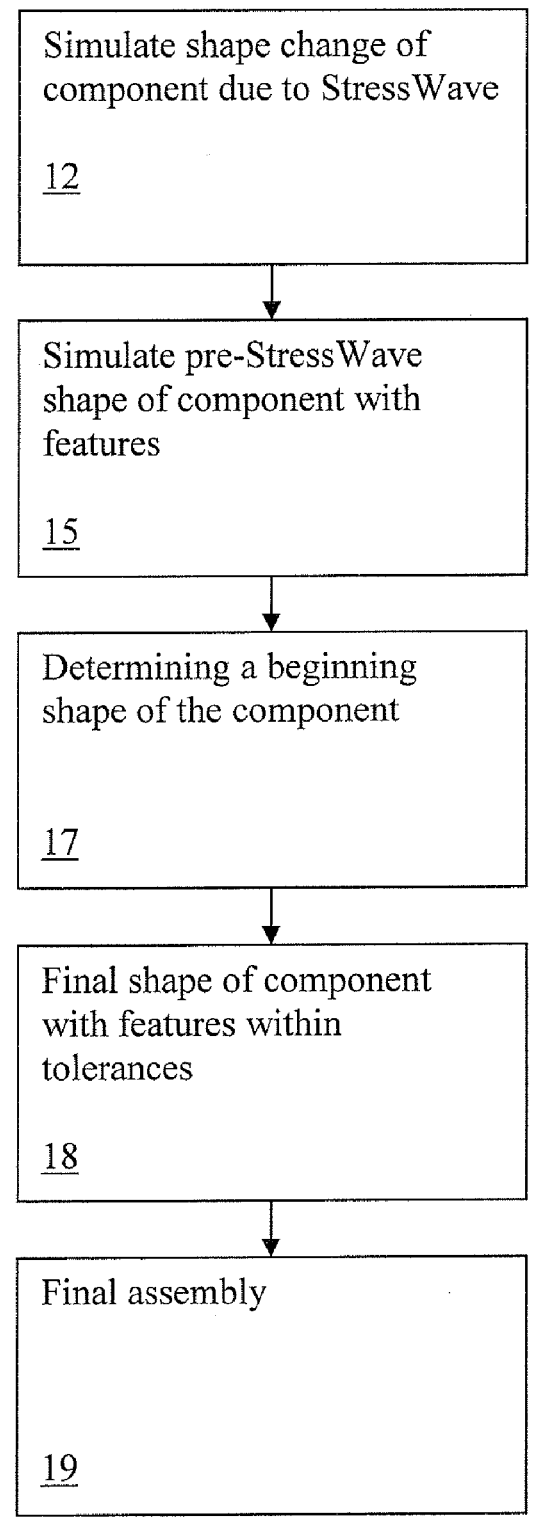
FIG. 1 shows one method for extending a length of service of structural components that may experience advanced dynamic change so that a final shape of the component is within a specified tolerance envelope to be used in final assembly.
Figure 2:
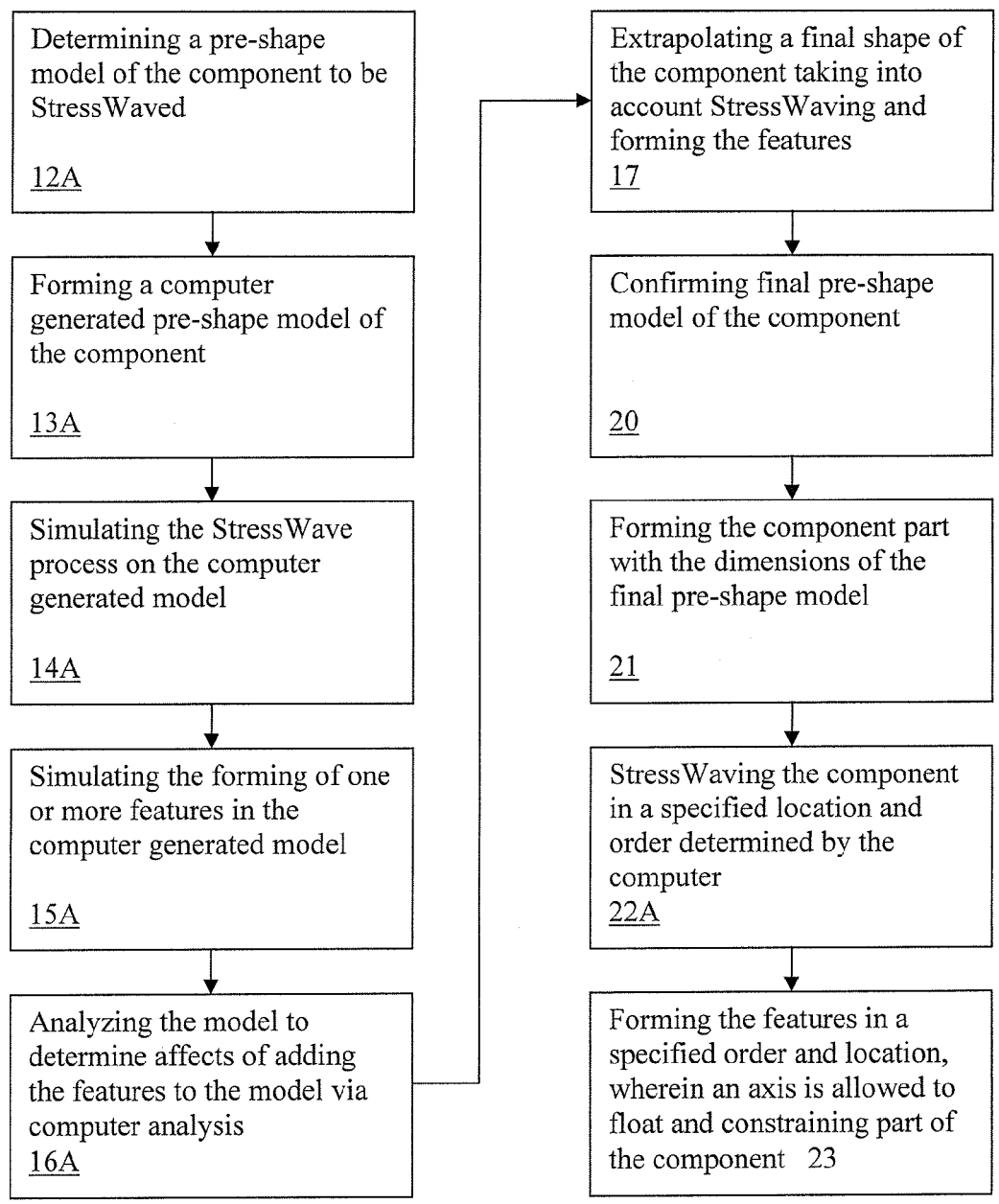
FIG. 2 shows another method for extending a length of service of structural components that may experience advanced dynamic change so that a final shape of the component is within a specified tolerance envelope to be used in final assembly.
Figure 3:
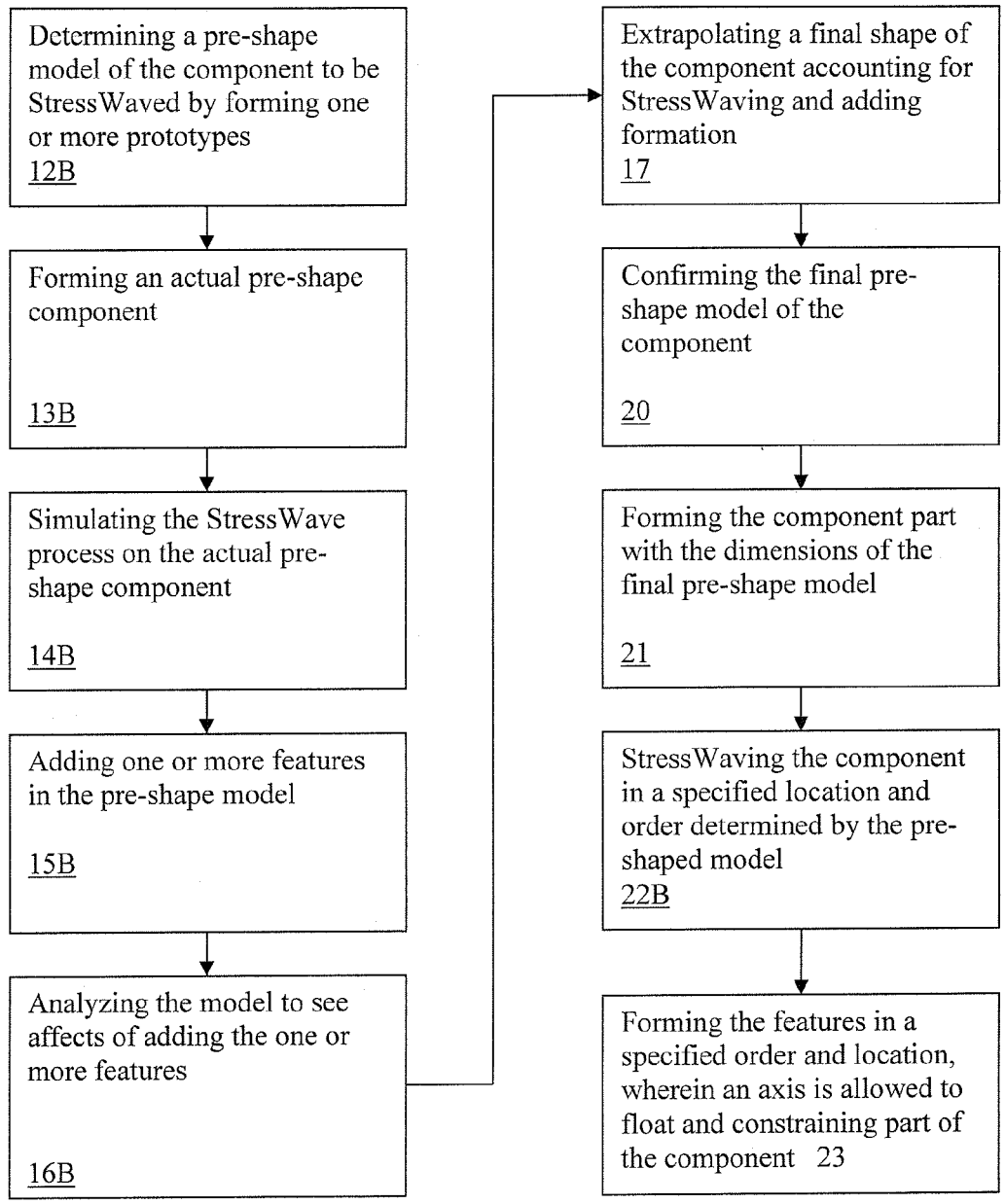
FIG. 3 shows another method for extending a length of service of structural components that may experience advanced dynamic change so that a final shape of the component is within a specified tolerance envelope to be used in final assembly.

With reference now to the FIGS. 1-3, different flowcharts are shown that disclose methods of extending a length of service of structural components that may experience advanced dynamic change. The methods allows, for example without limitation, fabricating a component with a large number of features and coldworking some or all of the feature locations prior to feature addition so that if a size and shape of the component is altered during this process, the final shape and size of the component will remain within a specified tolerance envelope. Fabrication of the component may involve, but is not limited to, molding, forging, forming, machining, or milling. Features may be added to the component for example, without limitation, during milling, drilling, or other machining. This processing allows the component to be used in final assembly. The methods below will be discussed in regards to StressWaving. However, other coldworking processes may be used. The component may be an aircraft or aerospace vehicle component or may be for a vehicle, such as without limitation, an aircraft, a spacecraft, or the like.

The term "dynamic changes," as used in the appropriate context throughout this disclosure, refers to the difference between one or more measured characteristics of a structure under inspection (and potentially effected by repeated exposure to factor(s) including, but not limited to, thermal load(s), structural load(s), oxidation, lightning, or electrical arcing) with expected values for the same characteristics of an analogous structure unaffected by repeated exposure to those factors. Advanced dynamic changes are a highly developed state of dynamic changes.

A determination of the pre-shape model is made by simulating a shape change of the component due to a coldworking process 12. The pre-shaped model will account for how coldworking affects the size and shape of the component. A coldworking process such as StressWaving, will apply compressive residual stresses at specific locations and/or areas of the component which may experience advanced dynamic changes. The individual or cumulative application of compressive residual stresses may alter the size and shape of the component.

In accordance with one embodiment, a pre-shaped model of the component is determined using existing software programs 12A. Different programs using finite element analysis may be used to extrapolate a pre-shaped model taking into consideration, for example and without limitation, the size and shape of the component, the material of the component, method of component fabrication, method or means of feature addition, the different areas of the component part where the residual stresses will be applied, and the like.

Alternatively, one or more prototypes may be fabricated 12B. The fabricated prototype component may be built, for example without limitation, using the same dimensions, method of fabrication, and materials as the actual item. The fabricated prototypes are put through the StressWave process. After the model has gone through the StressWave process, the model will be analyzed to see how the StressWave process affects the model. Actual measurements may be taken of the prototypes to see how the process altered the final size and shape of the prototype. One can extrapolate a starting shape of the component by using finite element analyses.

In accordance with one embodiment, a computer generated pre-shaped model is created 13A. A computer generated pre-shaped model may allow one to get a multidimensional view of the pre-shaped model without having to actually fabricate the part. The computer generated pre-shaped model will also save both time and money since an actual prototype of the pre-shaped model does not have to be built. Alternatively, one or more prototypes of the pre-shaped component may be fabricated 13B.

Once the pre-shaped model is created, either via a computer generated model and/or an actual physical prototype, the pre-shaped model is put through the StressWaving process. Different finite element methods may be used to simulate the StressWaving process 14A. Alternatively, the one or more prototypes of the pre-shaped component that were fabricated could be subjected to the StressWave process 14B. Each area of the pre-shaped component which may experience advanced dynamic changes may be StressWaved. The pre-shaped model that has been StressWaved will then be analyzed to determine if it is within design tolerances.

Once the pre-shaped model has been StressWaved, features may be added in the pre-shaped model 15. Features may be added in the computer generated model 15A or the pre-shape components that were fabricated 15B. The addition of the features may alter the shape of the pre-shaped model. Thus, the pre-shaped model that has been StressWaved and features added, needs to be compared to the engineering model to determine if the component is still within tolerance.

If the pre-shaped model is created via a software program, different finite element methods may be used 16A. Finite element analysis may be used to see how the StressWaving and feature forming process altered the final size and shape of the pre-shaped model. In a like manner, if one or more prototypes are built, and put through the StressWaving and feature forming process, actual measurements may be taken of the prototypes to determine whether the component is within tolerances 16B.

By using finite element analyses, one can extrapolate a final pre-shape model 17 including the location of the StressWave compressive zones of the component. The final pre-shape model needs to be one such that after applying the StressWave process to the final pre-shaped model in a specified method and locations, and adding the features in the desired locations and order, the final pre-shaped model will meet a pre-defined shape and be within a specified tolerance envelope 18 to be used in final assembly 19 without having to be scrapped or reworked.

A confirmation of the final pre-shape model of the component may be performed 20. The above analysis/steps are reapplied to the final pre-shaped model. Thus the analysis/steps to add features and StressWave may be reapplied to see if the final pre-shaped model which has been processed will meet the pre-defined shape and be within the specified tolerance envelope to be used in final assembly without having to be scrapped or reworked. Once the final pre-shape model of the component is confirmed, the component part may be formed with the dimensions of the final pre-shaped model 21. The component part may then be StressWaved in the locations that may experience advanced dynamic changes. StressWaving in different manners can affect the size and shape of the component part. Thus, to control the location of the StressWave for later feature addition, one needs to control the changes in relation to the StressWaved locations. Each location or feature of the component part to be StressWaved should be StressWaved in a specific location on the component and in a specific order as determined by the computer analysis 22A or the pre-shaped models that were formed 22B.

Features may be added to the StressWaved component in an order suitable to maintain the final component within tolerance 23. For instance, and without limitation, each feature may be drilled in the component according to a particular order or no order. StressWaving may be done in a particular order or no order. For instance, without limitation, a location may be StressWaved and a feature added in that location prior to the next location being stressWaved.

Figure 4:
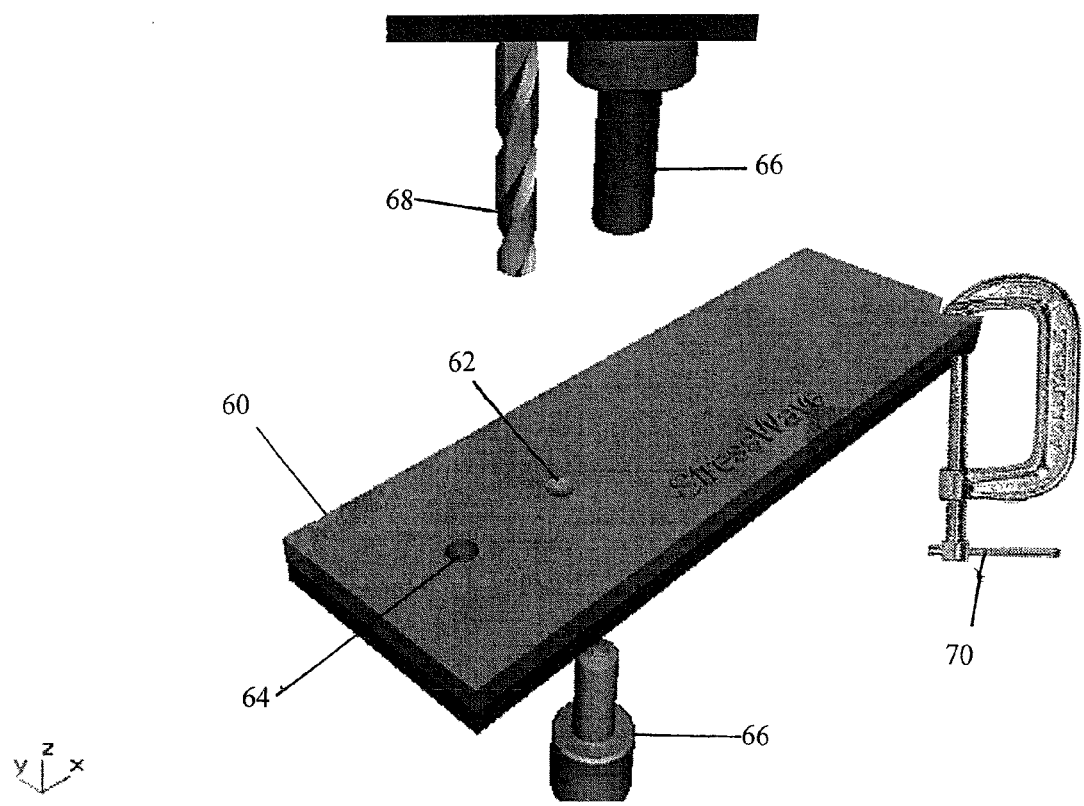
FIG. 4 is a perspective view of a component part being coldworked and formations added.

Referring now to FIG. 4, in order to control the locations 62 of the StressWave for later feature 64 additions, one needs to control the changes in relation to the StressWaved locations 62. Each location 62 of the component part 60 to be StressWaved should be StressWaved in a specific location 62 on the component 60 and in a specific order as determined by the computer analysis or the pre-shaped models that were formed. An indentation device 66 is used to create residual stresses around the locations 62 of the component 60 which may experience advanced dynamic changes. After the StressWaving process, features 64 may be added. Features 64 are added by machine 68. During the forming of the features 64, one may need to allow the component 60 to grow in one or more axis (X-Y-Z) or the component 60 may need to be constrain in one or more of the component part axis (X-Y-Z) from twisting or other changes to ensure the proper locations of each feature 64 formed. Different tools 70 may be used to prevent the component 60 from twisting. Alternatively, a user may manually, by hand, prevent the component 60 from twisting. Other methods may be used to prevent the component 60 from twisting.

Figure 5:
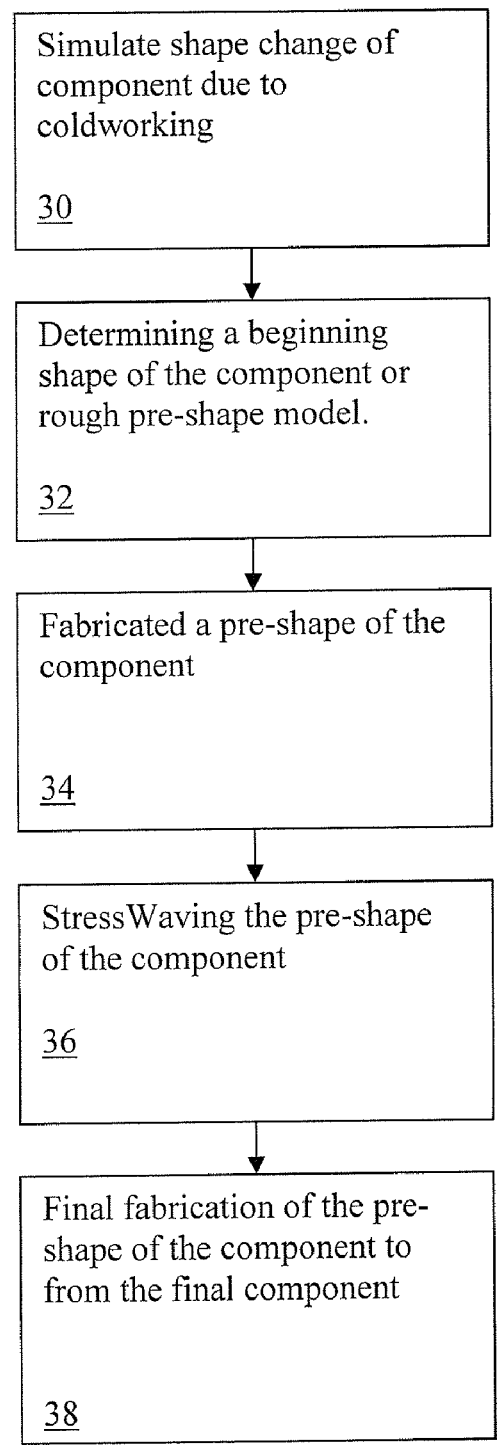
FIG. 5 shows another method for extending a length of service of structural components that may experience advanced dynamic change so that a final shape of the component is within a specified tolerance envelope to be used in final assembly.
Figure 6:
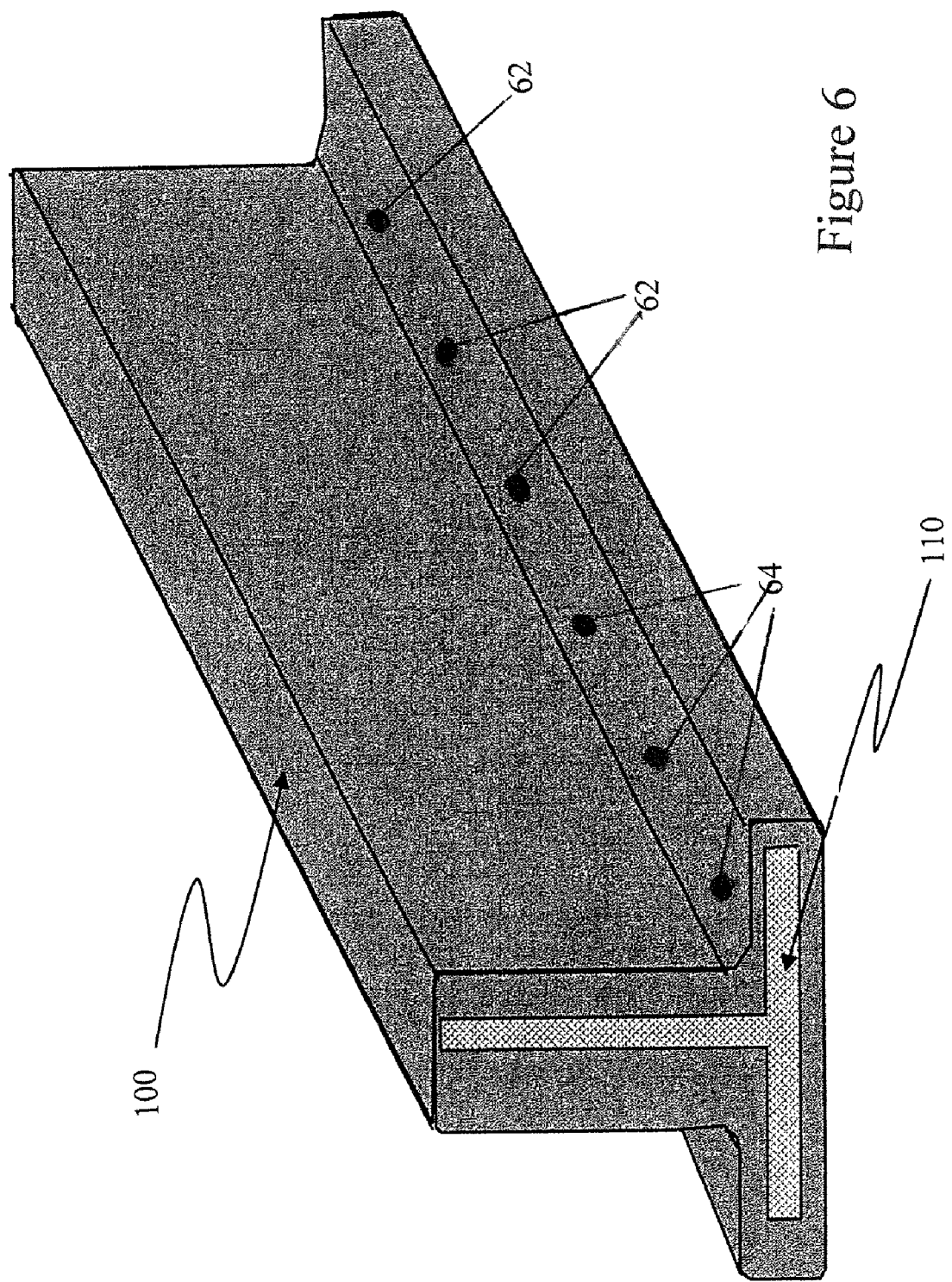
FIG. 6 is a perspective view of a pre-shape model formed in accordance with the method of FIG. 5.

In accordance with another embodiment, as shown in FIGS. 5 and 6, finite element analyses may be used to extrapolate a rough pre-shape model 100 taking into consideration, the size and shape of the component, the material of the component, the different areas of the component part where coldworking will be applied, and the like. As shown in the FIG. 5, a determination 32 of a rough pre-shape model is made by simulating a shape change of the component due to a coldworking process 30. The rough pre-shaped model 100 is then fabricated 34. The rough pre-shaped model 100 is formed thicker than the final component part 110 since the StressWave process will generate compressive zones in the areas of the component which may experience advanced dynamic changes. The StressWaving process may result in changes to the size and shape of the rough pre-shaped model. After StressWaving 36 each area of the rough pre-shaped model 100, the rough pre-shaped model 100 is then then refixtured and final fabrication 38 to form the component part 110. In this embodiment, finite element analyses may be used to establish a minimum size of the rough pre-shaped model 100 to allow the rough pre-shaped model 100 to be Stress-Waved and final machined to be used in final assembly.

By using the methods discussed above, one can extrapolate the dimension and/or a shape of a component that needs to be created. The desired shape of the component to be created takes into consideration addition of features and application of the StressWave process to specified features and possibly adding features that do not require StressWaving after the StressWave process. The component formed will meet a predefined shape so that the component is within a specified tolerance envelope so that it may allow finalizing of component fabrication prior to final assembly and eliminate final assembly drilling, coldworking, deburring and clean-up. Coldworking, drilling, deburring and clean-up may be completed prior to final assembly.

The ability to StressWave complex shapes further has the benefit of eliminating the need to remove the component after the formation process and/or during assembly to coldwork and/or add features and/or clean and debur. This can be a major reduction in manufacturing costs and/or part weight. The flexibility of StressWaving allows it to be used upstream of final assembly providing further cost reductions when compared to other coldworking processes.

While embodiments of the disclosure have been described in terms of various specific embodiments, those skilled in the art will recognize that the embodiments of the disclosure can be practiced with modifications within the spirit and scope of the claims.

What is claimed is:

1. A method for working a component to reduce a propensity for advanced dynamic change comprising:
   analyzing affects of a coldworking process on at least one location on a size and shape of the component;
   analyzing affects of adding at least one feature on a size and shape of the component; and
   determining a beginning shape of the component by extrapolating the beginning shape of the component so the component is within a specified tolerance envelope after coldworking and adding the at least one feature.

2. The method of claim 1 wherein determining a beginning shape of the component further comprises extrapolating the beginning shape of the component so the component is used in final assembly unmodified after coldworking and adding the at least one feature.

3. The method of claim 1 wherein analyzing affects of a coldworking process on the size and shape of the component comprises:
   creating a model of the component;
   coldworking the model;
   analyzing affects of coldworking on the size and shape of the model; and
   extrapolating a beginning pre-shape of the model of the component.

4. The method of claim 1 wherein analyzing affects of adding at least one feature on a size and shape of the component further comprises adding the at least one feature in the at least one location affected by the coldworking process.

5. The method of claim 3 wherein analyzing affects of adding at least one feature on a size and shape of the component comprises:
   forming at least one feature in the model after coldworking the model; and
   analyzing affects of coldworking and forming the at least one feature on the size and shape of the model.

6. The method of claim 1 further comprising fabrication the component with the beginning shape.

7. The method of claim 6 further comprising coldworking the beginning shape in a specified location and order.

8. The method of claim 7 further comprising:
   forming the at least one feature in the beginning shape in a specified order; and
   allowing at least one axis of the component to be unrestrained when forming the at least one feature.

9. The method of claim 8 further comprising constraining part of the component from moving during forming of the features.

10. The method of claim 1 wherein the component is an aerospace vehicle component.

11. The method of claim 1 further comprising:
    analyzing affects of a coldworking process on a plurality of locations and in a specified order on a size and shape of the component; and
    analyzing affects of adding a plurality of features, the features formed in a specified order, on a size and shape of the component.

12. A method for working a component to reduce a propensity for advanced dynamic change comprising:
    analyzing affects of a coldworking process on a plurality of locations and coldworked in a specified order on a size and shape of the component;
    analyzing affects of adding a plurality of features, the features formed in a specified order, on a size and shape of the component;
    determining a beginning shape of the component by extrapolating the beginning shape of the component wherein the component is used in final assembly unmodified after coldworking and adding the at least one feature;
    fabrication the component with the beginning shape;
    coldworking the beginning shape in specified locations and in a specified order;
    forming the features in the beginning shape in a specified order; and
    allowing at least one axis of the component to float when forming the at least one feature.

13. The method of claim 12 wherein analyzing affects of a coldworking process on the size and shape of the component comprises:

creating a model of the component;

coldworking the model;

analyzing affects of coldworking on the size and shape of the model; and extrapolating a beginning preshape of the model of the component.

14. The method of claim 12 further comprising constraining part of the component from moving during forming of the features.

15. The method of claim 12 wherein the component is an aerospace vehicle component.

* * * * *